(12) United States Patent
He

(10) Patent No.: US 6,293,056 B1
(45) Date of Patent: Sep. 25, 2001

(54) MULTI-PURPOSE ABOVE-CEILING UTILITY SUPPORT SYSTEM

(76) Inventor: Ping He, 1062 Thistlegate Rd., Agoura, CA (US) 91301

( * ) Notice: Subject to any disclaimer, the term of this patent is extended or adjusted under 35 U.S.C. 154(b) by 0 days.

(21) Appl. No.: 09/285,227

(22) Filed: Apr. 1, 1999

(51) Int. Cl.[7] .................................................. F16L 3/22
(52) U.S. Cl. ..................... 52/39; 52/27; 52/712; 248/49; 248/68.1
(58) Field of Search .................. 52/39, 27, 506.06, 52/712, 702; 248/49, 68.1, 343, 74.2

(56) References Cited

U.S. PATENT DOCUMENTS

| | | | |
|---|---|---|---|
| 2,535,427 | * 12/1950 | Kindorf | 248/68.1 |
| 2,978,571 | * 4/1961 | Rosenblatt | 52/506.06 X |
| 3,385,020 | * 5/1968 | Olson | 52/506.06 X |
| 3,508,730 | * 4/1970 | Kenzo, Jr. | |
| 3,544,049 | * 12/1970 | Brown | 248/68.1 |
| 3,565,385 | * 2/1971 | Zurawski | 248/68.1 X |
| 3,674,233 | * 7/1972 | Van Buren, Jr. | 248/68.1 |
| 3,782,058 | * 1/1974 | Allen | 52/712 X |
| 3,929,277 | * 12/1975 | Perrault et al. | 248/68.1 X |
| 4,709,888 | * 12/1987 | Cubit et al. | 248/68.1 X |
| 4,960,253 | * 10/1990 | Perrault et al. | 248/68.1 |
| 5,081,812 | * 1/1992 | Reynolds | 52/506.06 |
| 5,149,026 | * 9/1992 | Allen | 248/68.1 |
| 5,791,607 | * 8/1998 | Thibault et al. | 248/68.1 X |

* cited by examiner

*Primary Examiner*—Beth A. Stephan
*Assistant Examiner*—Brian E. Glessner
(74) *Attorney, Agent, or Firm*—Roy A. Ekstrand

(57) ABSTRACT

A plurality of utility distribution system elements such as cables, wires, pipes or ducts are supported in the space existing between a suspended ceiling and the upper adjacent floor by a plurality of support brackets. The support brackets include elements having a shape corresponding generally to an inverted L which are secured to the undersurface of the upper adjacent floor and thereby provide downwardly extending vertical elements. A plurality of slots are formed in the support brackets and a plurality of elongated straps are securable to the support brackets using the slots and bending tabs formed in the straps. The straps cooperate with the support bracket to secure various utility distribution system elements such as pipes, cables, wire bundles or ducts. In an alternate embodiment, the support brackets are arranged in pairs and are joined by horizontally extending braces therebetween to form ladder-like support structures which receive and support various utility distribution elements.

5 Claims, 2 Drawing Sheets

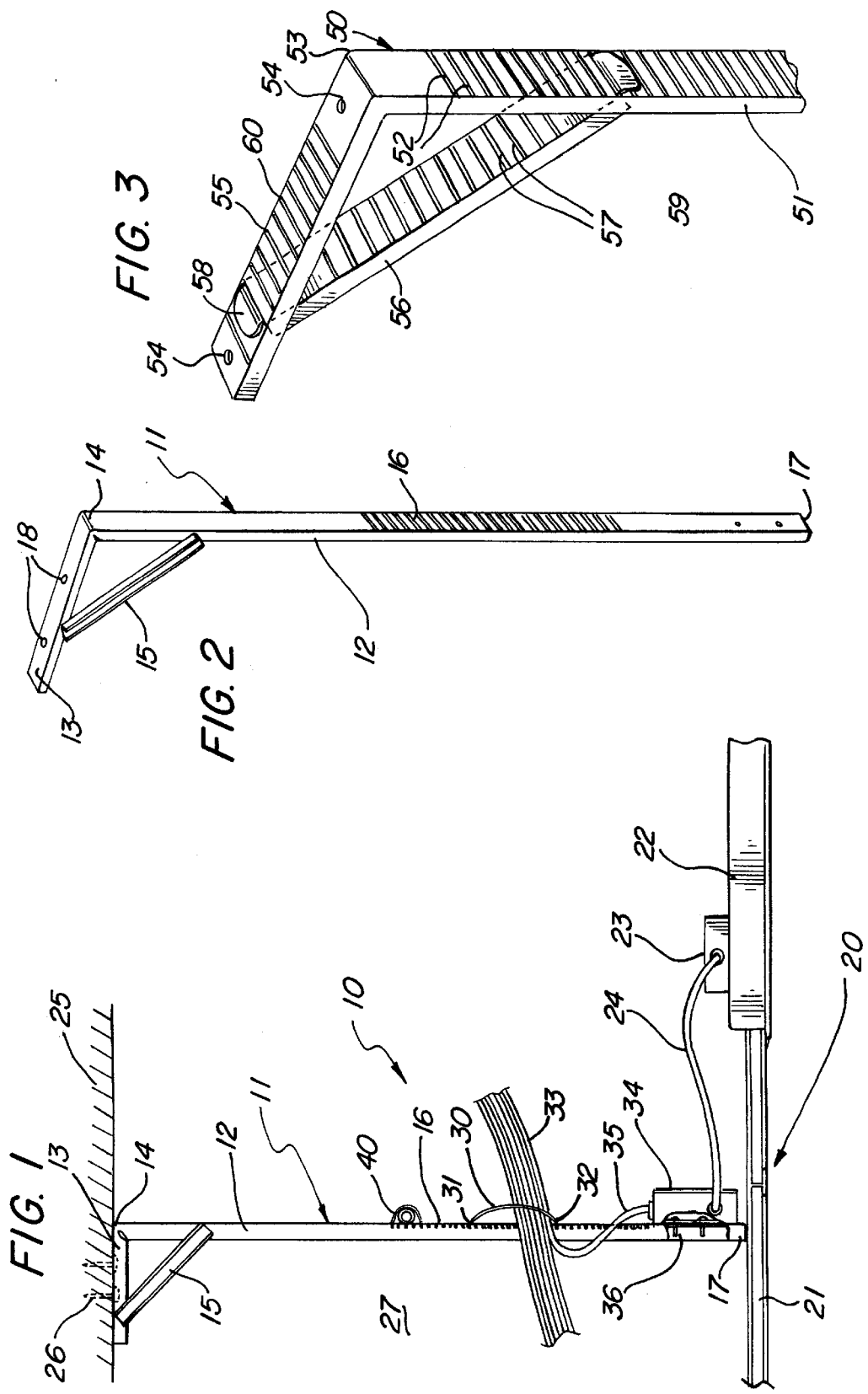

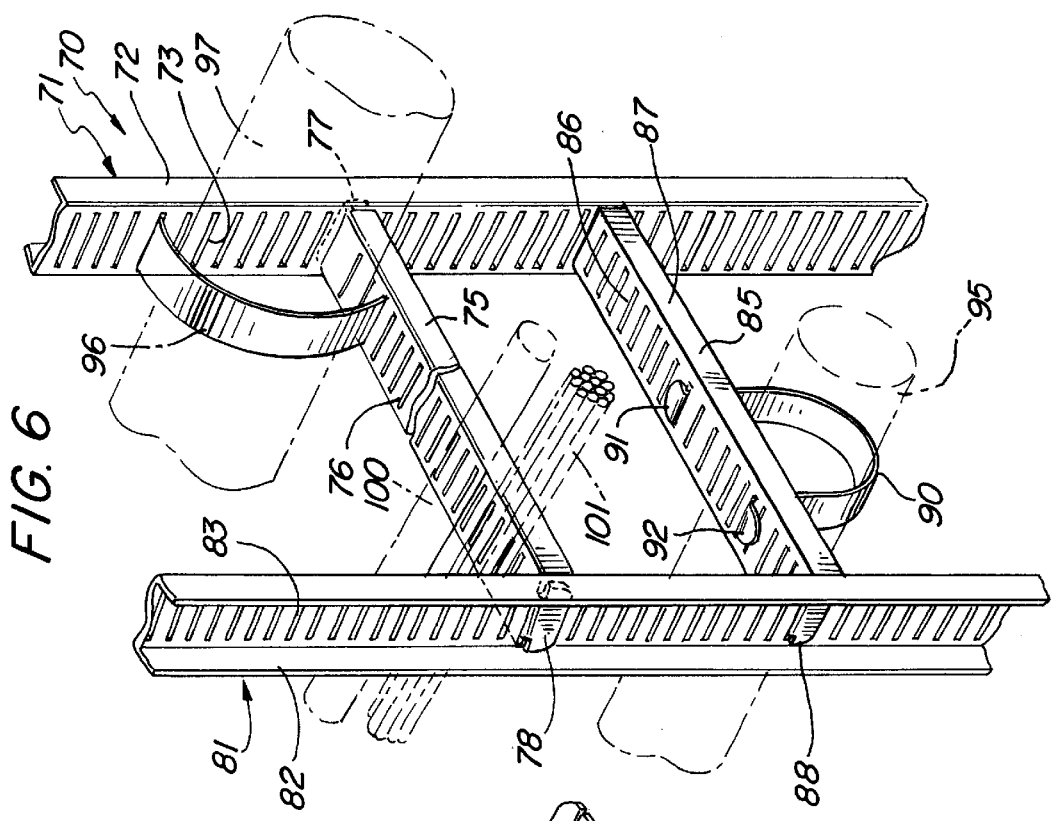
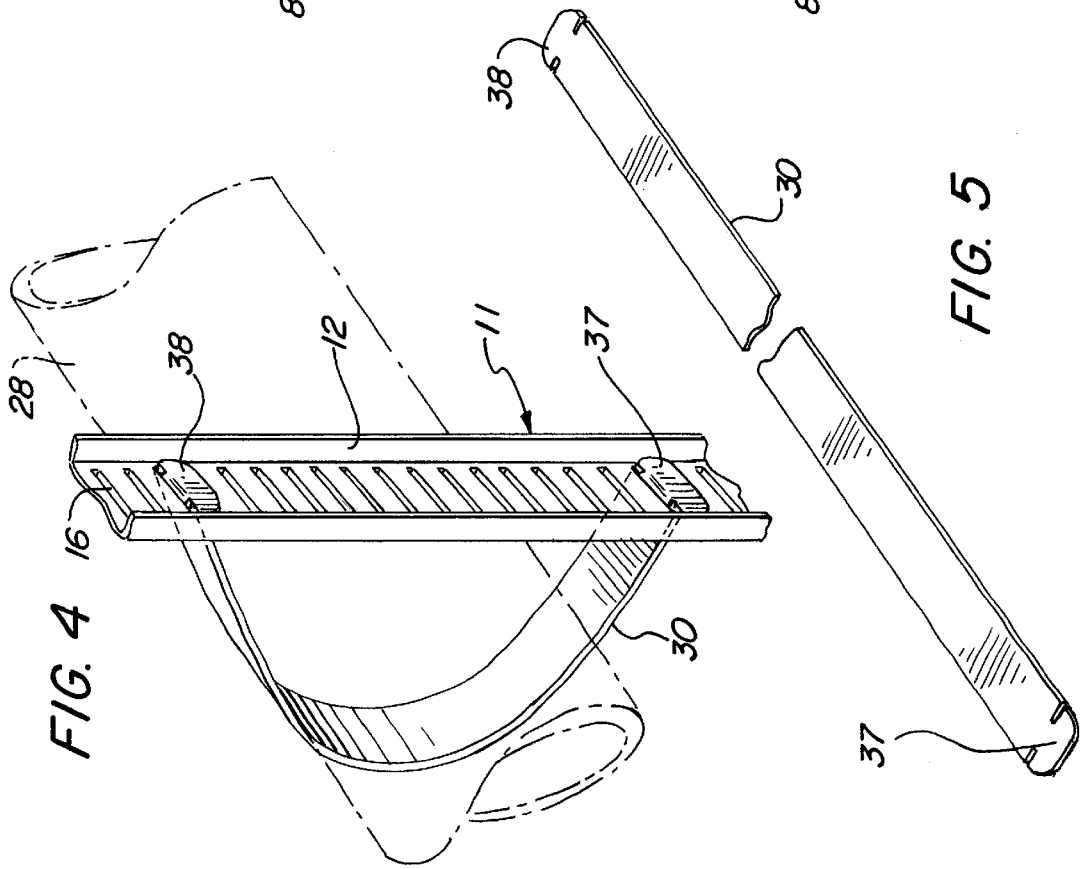

MULTI-PURPOSE ABOVE-CEILING UTILITY SUPPORT SYSTEM

FIELD OF THE INVENTION

This invention relates generally to utility distribution systems such as electrical power distribution, air-conditioning duct work, plumbing pipe systems, fire sprinkler systems, and the like and particularly to systems for supporting such utility distribution apparatus above a suspended ceiling.

BACKGROUND OF THE INVENTION

Many buildings such as entertainment facilities, airports and commercial buildings utilize a method of construction which employs structures known as "suspended ceilings". Such suspended ceilings are so named due to the structure utilized in which a grid of rigid supports often made of steel of aluminum or the like is hung or suspended from the underside of the floor above the room by a plurality of cables or metal wires. In such suspended ceilings, the spaces within the metal support grid are filled with acoustic and insulative material tiles often formed in uniform square or rectangular shapes. In addition to ceiling tiles, the grid typically supports one or more light fixtures as well as a number of air circulation vents such as those used for heating and air-conditioning.

Because the typical suspended ceiling is positioned several feet beneath the underside of the floor above the room area, a substantial space exists between the suspended ceiling and the underside of the next floor surface or roof of the room. This space is utilized in routing a number of utility distribution devices such as electrical power wiring, air-conditioning or heating duct work, telephone wiring or cable. In many systems, heavier circulation elements such as plumbing system pipes or sprinkler system pipes are also supported within the space above the suspended ceiling.

The use of such suspended ceilings and the space above the suspended ceiling grid provides several advantages with particular advantage in commercial establishments such as office buildings or the like. In addition to providing attractive ceilings for the rooms or offices within such facilities, suspended ceilings are advantageous in that they readily accommodate the desired positioning of interior walls, light fixtures and vents of even more advantage is the flexibility which such suspended ceiling structures provide in that the movement or repositioning or other changes to such lighting fixtures, vents and the like is easily accomplished within the grids. The space above the suspended ceiling grid is also advantageous in that it is easily accessible by simply removing one or more ceiling tiles to facilitate repair or change such as occurs during remodeling.

Unfortunately, the many advantages of such suspended ceilings are partially offset by attendant problems and limitations. One of the most vexing problems arises out of the difficulty of supporting the various utility systems and distribution elements within the space. Despite orderly initial installation, even the best of systems tend to become a tangled relatively disorganized mess after several remodelings and changes have been undertaken. In addition, the ceiling grid itself is limited as to the weight which can be reliably and safely carried. Also, in areas in which earthquake damage and hazard is a concern, various building codes impose strict limitations on the support which must be provided for overhead utility distribution systems.

There arises, therefore, a need in the art for evermore improved utility support systems which accommodate the characteristics and structure of suspended ceilings and which provide and maintain flexibility of use.

SUMMARY OF THE INVENTION

Accordingly, it is a general object of the present invention to provide an improved above-ceiling support system for particular use in facilities having suspended ceilings. It is a more particular object of the present invention to provide an improved above-ceiling utility support system which provides flexibility and reliable support for a wide variety of utility distribution systems. It is a still further object of the present invention to provide an improved above-ceiling utility support system which maintains safe utility system support in the event of building damage such as may occur during earthquakes or the like.

In accordance with the present invention, there is provided a utility support system for use in combination with a structure having an upper-adjacent floor and a suspended ceiling spaced beneath the upper adjacent floor to define an above-ceiling space, the utility support system comprising: at least one support bracket having means for attachment to the undersurface of an upper-adjacent floor and a downwardly extending vertical element, the vertical element defining a first plurality of slots; and a plurality of elongated straps each having end tabs receivable within selected ones of the first plurality of slots, the end tabs each being inserted into a selected slot and bent over to secure its respective end to the vertical element forming a closed loop against the vertical element suitable for passing a utility distribution element therethrough.

The invention further provides a utility support system for use in combination with a structure having an interior area having an upper surface and a lower suspended ceiling forming an above-ceiling space therebetween, the utility support system comprising: a first support bracket having first means for attachment to the upper surface and a first downwardly extending vertical element defining a first plurality of slots; a second support bracket having second means for attachment to the upper surface and a second downwardly extending vertical element defining a second plurality of slots, the second support bracket being positioned proximate the first support bracket such that the first and second vertical elements are closely spaced; and at least one brace having a generally rigid body and first and second end tabs, the at least one brace secured between the first and second vertical elements and the first and second end tabs each being inserted through a respective one of the slots in the respective first and second pluralities of slots and the end tabs being bent to secure the brace, whereby utility distribution elements such as pipes or wires or cables may be supported by the at least one brace.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a side elevation view of a utility support system constructed in accordance with the present invention in a typical above-ceiling installation;

FIG. 2 sets forth a perspective view of the support bracket of the present invention utility support system;

FIG. 3 sets forth a partial perspective view of an alternate embodiment of the present invention utility support system;

FIG. 4 sets forth a partial perspective view of the support bracket of the present invention utility support system having a typical support strap secured thereto;

FIG. 5 sets forth a perspective view of a typical utility element support strap utilized in the present invention system; and FIG. 6 sets forth a partial perspective view of a dual bracket installation utilizing the present invention utility support system.

DESCRIPTION OF THE PREFERRED EMBODIMENTS

FIG. 1 sets forth a utility support system constructed in accordance with the present invention and generally referenced by numeral 10. Utility support system 10 is shown in a typical installation suspended from the undersurface of a conventional floor 25. In further accordance with the anticipated use of the present invention system, utility support system 10 is supported above a conventional suspended ceiling 20. In further accordance with conventional fabrication techniques, suspended ceiling 20 includes a support grid 21 fabricated in accordance with conventional fabrication techniques which is suspended beneath floor 25 of the host building utilizing a plurality of conventional suspension wires (not shown) which will be understood to support grid 20 in a conventional manner. As a result of the suspension of ceiling 20 beneath floor 25, a space is formed which is identified as above-ceiling space 27 in FIG. 1. It will be recognized that in different building fabrications, the heighth of above-ceiling space 27 varies. In further accordance with conventional fabrication techniques, a conventional light fixture 22 is supported by grid 21 by conventional support means (not shown) and includes an electrical power connection box 23. Light fixture 22 further includes a conventional electrical power coupling wire set 24 extending from connection box 23.

In further accordance with conventional fabrication techniques, floor 25 is fabricated of a conventional material which may, for example, comprise a premolded concrete floor or molded in place concrete floor. Floor 25 may, alternatively, be fabricated of a wooden material or a plurality of steel or iron supports.

In accordance with the present invention, utility support system 10 includes a plurality of support brackets substantially identical to support bracket 11. Support bracket 11 includes a vertical element 12 defining a plurality of slots 16 and a lower end 17. Support bracket 11 further includes a horizontal element 13 joined to vertical element 12 at a corner bend 14. Corner bend 14 may, alternatively, be formed as a true bend in the material of support bracket 11 or may be fabricated using joined pieces for vertical element 12 and horizontal element 13 secured using conventional welding or other fabrication. Horizontal element 13 is secured to the undersurface of floor 25 by conventional fasteners 26. As is better seen in FIG. 2, horizontal element 13 defines a plurality of apertures 18 which allow fasteners 26 to be passed therethrough securing horizontal element 13 and supporting bracket 11. It will be further understood that fasteners 26 are selected in accordance with the appropriate type of fastener to provide attachment to floor 25. For example, if floor 25 is fabricated of a wooden material or the like, conventional threaded "wood screw" fasteners may be used. Alternatively, should floor 25 be formed of a different material such as preformed concrete, fasteners 26 comprise conventional concrete fasteners such as the well known explosive charge fasteners used for concrete attachment. The essential element of fasteners 26 is the securing of horizontal element 13 to floor 25.

Support bracket 11 further includes an angle brace 15 which, in the embodiment shown in FIG. 1, is joined to vertical element 12 and horizontal element 13 by conventional welding. As is seen in FIG. 3, angle brace 15 may be formed using alternative fabrication such as brace 56 shown in FIG. 3. The essential function of brace 15 is to provide a strengthening of the bend in support bracket 11 formed at corner bend 14.

In accordance with an important aspect of the present invention, vertical element 12 of support bracket 11 is utilized to provide secure attachment and support for a plurality of different utility distribution items which are transversing various portions of above-ceiling space 27. Thus, by way of example, a strap 40 of the type shown in FIG. 5 as strap 30 is secured within a pair of slots 16 in the manner shown in FIG. 4 to support a pipe 41. Pipe 41 may, for example, comprise a portion of the water distribution system of the fire prevention sprinklers or other distribution system. By way of further example, a strap 30 (shown in FIG. 5) is secured to support bracket 11 in the manner seen in FIG. 4 utilizing an additional pair of slots 16 to support a plurality of wires forming a wire bundle 33. Thus, strap 30 is secured to vertical element 12 of support bracket 11 at attachment points 31 and 32. In further accordance with the present invention, an electrical junction box 34 is secured to the lower end of support bracket 11 by conventional fasteners 36. The outer end of power connection wire set 24 is received within junction box 34 and is connected to a power line 35 by conventional means (not shown). Power line 35 passes from bundle 33 beyond strap 30 and extends downwardly into junction box 34.

Thus, in the example of the present invention utility support system shown in FIG. 1, a support bracket is utilized to secure a plurality of utility distribution apparatus including pipes, wire bundles and electrical junction box in a secure, safe and orderly attachment. While not seen in FIG. 1, it will be understood by those skilled in the art that the most advantageous use of the present invention utility support system employs a plurality of support brackets such as support bracket 11 or the alternative arrangement shown in FIG. 6 to provide secure orderly support of various utility distribution elements. It will be well understood by those skilled in the art that the arrangement of support straps shown in FIG. 1 is provided for purposes of illustration and that the present invention is not limited to any particular arrangement of supporting straps or utility distribution systems. The important aspect with respect to the present invention is the provision of a utility support system having a plurality of support brackets such as support bracket 11 situated beneath and secured to floor 25 above suspended ceiling 20 facilitates running the various utility system distribution elements about space 27 as needed. It will be further apparent by examination of FIG. 1 that the support of utility distribution elements utilizing the present invention system provides a substantial improvement in safety and reliability due to the secure attachment to support bracket 11 and floor 25. Further, it will be noted that the utility distribution elements secured by bracket 11 are not dependent upon nor do they impose any weight or stress upon grid 21. That is to say, the present invention utility support system will be understood to be entirely independent of the strength of suspended ceiling 20.

FIG. 2 sets forth a perspective view of support bracket 11 having all straps and other supported materials removed therefrom. Thus, support bracket 11 defines a shape generally corresponding to an inverted L having horizontal element 13 and vertical element 12 joined at a corner bend 14. Bracket 11 further includes a plurality of slots 16 formed in vertical element 12 and a pair of apertures 18 formed in horizontal element 13. Apertures 18 and slots 16 are utilized in the manner described above in FIG. 1 and described in FIGS. 4 and 6 in greater detail. Suffice it to note here that apertures 18 facilitate securing horizontal element 13 to the undersurface of the floor above the room of interest while slots 16 receive the end tabs of various attachment straps such as straps 30 and 40 shown in FIG. 1. Angle bracket 15 is welded to vertical element 12 and horizontal element 13 to maintain the right angle formed at bend 14. In the preferred fabrication of the present invention, support bracket 11 is fabricated of a rigid material such as steel or the like. However, it will be recognized that a variety of materials having sufficient strength and rigidity may be used to fabricate support bracket 11 without departing from the spirit and scope of the present invention.

FIG. 3 sets forth a partial perspective view of an alternate embodiment of the present invention utilizing a support bracket 50 which is operated and utilized in the same manner as support bracket 11 described above. Support bracket 50 corresponds generally to the structure of support bracket 11 in that it includes a vertical element 51 joined to a horizontal element 55 at a right angle bend 53. Horizontal element 55 further defines a pair of apertures 54 utilized in securing element 55 to the undersurface of a floor such as floor 25 (seen in FIG. 1). In contrast to the use of a welded angle brace 15 in support bracket 11 shown in FIGS. 1 and 2, support bracket 50 utilizes a brace 56 having end tabs 58 and 59 for providing reinforcement of the right angle bend at corner 53. Tabs 58 and 59 are forced through the appropriate ones of slots 60 and 52 respectively and thereafter bent over to secure brace 57 between elements 51 and 55. When in place, brace 56 secures the angular relationship between elements 51 and 55. In addition, to provide greater flexibility, brace 56 defines a plurality of slots 57 which may receive end tabs of various straps if needed such as straps 30 and 40 shown in FIG. 1.

FIG. 4 sets forth an illustrative example of attachment of a conventional pipe 28 to vertical element 12 of support bracket 11. In further accordance with the present invention, a flexible strap 30 preferably formed of steel or other suitably rigid but bendable material defines end tabs 37 and 38 which are inserted through a selected pair of slots 16 in vertical element 12. To maintain attachment of strap 30, tabs 37 and 38 are bent over to secure strap 30 to vertical element 12. As illustrated in FIG. 4, tabs 37 and 38 may, at the user's choice or preference, be bent over in either an outwardly extending or inwardly extending angular relationship. The essential aspect of bending tabs 37 and 38 is to provide secure attachment of the strap to the support bracket. For purposes of illustration, an elongated cylindrical pipe 28 is shown passing through strap 30 and will be understood to be supported thereby. While a cylindrical pipe 28 is illustrated in FIG. 4, other elements having different shapes such as square or rectangular or the like may also be supported within strap 30 and it will be understood that the present invention is by no means limited to cylindrical objects. Further, in place of pipe 28, it will be understood that other elements such as air-conditioning and heating ducts may be supported in the manner shown in FIG. 4.

FIG. 5 sets forth a perspective view of an illustrative strap 30 having end tabs 37 and 38. It will be understood that strap 30 is provided as an illustration of a support strap operable within the present invention system. However, it will also be understood that differently shaped and different length straps may be utilized within the present invention system without departing from the spirit and scope of the present invention.

FIG. 6 sets forth a partial perspective view of a still further alternate embodiment of the present invention generally referenced by numeral 70. Utility support system 70 differs from the above-described embodiments of the present invention in that support brackets substantially identical to support bracket 11 shown above in FIG. 2 or support bracket 50 shown in FIG. 3 are arranged in parallel pairs having cross braces to form "ladder-like" support structures which are positioned within above-ceiling space 27 (seen in FIG. 1). Thus, utility support system 70 includes a pair of support brackets 71 and 81 arranged in a generally parallel closely spaced arrangement. While not seen in FIG. 6, it will be understood that support brackets 71 and 81 are, in their preferred form, substantially the same as the above-described support brackets such as support brackets 11 or 50 shown in FIGS. 2 and 3. Thus, support bracket 71 includes a vertical element 72 defining a plurality of slots 73. Correspondingly, support bracket 81 includes a vertical element 82 defining a plurality of slots 83. In further accordance with the embodiment of the present invention shown in FIG. 6, a plurality of cross-braces such as braces 75 and 85 extend between and are joined to support brackets 71 and 81. More specifically, brace 75 which, in its preferred form, is fabricated in substantially the same manner as brace 56 shown in FIG. 3 includes end tabs 77 and 78 as well as a plurality of slots 76. Tabs 77 and 78 extend through respective slots 73 and 83 of support brackets 71 and 81 respectively and are bent over to provide secure attachment of brace 75. Similarly, brace 85 defines a plurality of slots 86 and a pair of end tabs 87 and 88. Tabs 87 and 88 extend through a selected pair of slots 73 and 83 and are thereafter bent over to secure brace 85.

The provision of parallel support brackets 71 and 81 and cross-braces 75 and 85 provides a highly rigid secure support structure which is able to facilitate the support of virtually any utility distribution element. For purposes of illustration, an elongated pipe 97 is secured to vertical element 72 and cross-brace 75 by a strap 96. While not seen in FIG. 6, it will be understood that strap 96 is fabricated in substantially the same manner as strap 30 shown in FIG. 5. Accordingly, strap 96 encircles a portion of pipe 97 and captivates it against vertical element 72 and brace 75 using tabs extending through slots 83 and 76 respectively. The result is a secure attachment of pipe 97 using a simple, easy to install strap 96. By way of further illustration of the use of utility support system 70, a plurality of wires and/or cables forming a bundle 101 is shown supported by simply passing the bundle across a portion of brace 75. Similarly, an elongated element 100 such as a conduit or water pipe is also supportable by simply passing it over brace 75. Thus, for certain types of elements in the present invention system, it may be unnecessary for the user to install attachment straps.

By way of further illustration of the flexibility and multiuse of the present invention system, a strap 90 secured to brace 85 by bent over tabs 91 and 92 support an elongated element such as a pipe or air-conditioning duct beneath brace 85 in an underslung type support. This type of attachment using strap 90 on the underside of a supporting brace is most likely limited to relatively light objects but illustrates further the flexibility of use of the present invention support system.

In the anticipated use of the support system shown in FIG. 6, a plurality of support bracket pairs arranged as shown by support brackets 71 and 81 are spaced throughout above-ceiling space 27 (seen in FIG. 1) to provide support of elongated utility distribution elements.

What has been shown is a multi-purpose above-ceiling utility support system which facilitates an orderly, efficient and effective system of securing and supporting the distribution elements of various utility systems within the above-ceiling space. The system shown is extremely flexible and provides easy assembly and change of fabrication through the use of relatively simple elements which are mutually secured by convenient bending tabs and slots formed therein. As a result, the utility support system of the present invention greatly simplifies repair or change of the utility system distribution elements. The support system shown is extremely strong and properly fabricated and installed capable of meeting virtually any existing or anticipated codes relating to earthquake resistance and the like.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A utility support system for use in a structure having an upper-adjacent floor and a suspended ceiling spaced beneath the upper adjacent floor to define an above-ceiling space, said utility support system comprising:

at least one support bracket having means for attachment to the undersurface of an upper-adjacent floor and a downwardly extending vertical element, said vertical element defining a first plurality of slots; and a plurality of elongated straps each having end tabs receivable within selected ones of said first plurality of slots, said end tabs each being inserted into a selected slot and bent over to secure its respective end to said vertical element forming a closed loop against said vertical element suitable for passing a utility distribution element therethrough, said means for attachment including a horizontal element defining a plurality of apertures therein joined to said vertical element to support said vertical element substantially perpendicular to said upper-adjacent floor, and said horizontal element defining a second plurality of slots and being joined to said vertical element at a corner bend, said utility support system further including an angle brace having end tabs one of which is inserted into one of said slots in said first plurality and the other end tab being inserted into one of said slots in said second plurality.

2. The utility support system set forth in claim 1 wherein said horizontal element is joined to said vertical element at a corner bend.

3. The utility support system set forth in claim 2 wherein said suspended ceiling includes a light fixture and wherein said junction box is an electrical system junction box and wherein an electrical power wire is passed through one of said straps to said junction box and is connected therein to said light.

4. The utility support system set forth in claim 3 further including an angle brace joined to said vertical element and said horizontal element so as to span said corner bend.

5. The utility support system set forth in claim 4 wherein at least one of said plurality of straps receives a wire bundle.

* * * * *